United States Patent Office 3,332,946
Patented July 25, 1967

3,332,946
1-(2-HYDROXYALKYL)-3,5-DIALLYL ISOCYANURATES
Edwin D. Little, Hopewell, Va., assignor to Allied Chemical Corporation, New York, N.Y., a corporation of New York
No Drawing. Filed June 25, 1965, Ser. No. 467,101
5 Claims. (Cl. 260—248)

This invention relates to novel isocyanurate compounds and to a process for preparing the same. More particularly, the present invention relates to trisubstituted isocyanurate compounds having both allyl and hydroxyalkyl substituents.

The novel compounds of the present invention may be represented by the following general formula:

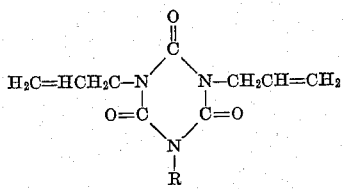

wherein R is a hydroxyalkyl group having from 2 to 4 carbon atoms.

The novel compounds are prepared in accordance with the present invention by reacting 1,3-diallyl isocyanurate with an alkylene oxide in a suitable inert solvent at a temperature of from 25 to 150° C. and under atmospheric pressure. Preferably, the reaction should be carried out at a temperature of from 120 to 140° C. Reaction time may vary from 1 to 3 hours; however, it has been found that the reaction is usually sufficiently complete after about 2 hours. The resulting isocyanurate product is advantageously recovered by vacuum distillation.

The 1,3-diallyl isocyanurate which is used as a starting material in the process of the present invention may be prepared in accordance with the disclosure in U.S. Patent 3,065,231 to Allied Chemical Corporation. Examples of alkylene oxides which may be used in the instant process include ethylene oxide, propylene oxide and butylene oxides. Suitable solvents are those which dissolve and are inert to the 1,3-diallyl isocyanurate and the alkylene oxide. Examples of such solvents include N,N-dimethyl formamide and 1-methyl-2-pyrrolidone.

The novel compounds of the present invention are particularly suitable for making polymers for use in coatings, adhesives and elastomers. Homopolymers are readily produced from the compounds of the present invention by heating the same in the presence of a suitable solvent and catalyst. The alcoholic groups in these compounds give increased solubility to polymers prepared therefrom and can serve to promote cross-linking.

The following examples illustrate the present invention. Parts are by weight unless otherwise specified. Temperatures are given in degrees centigrade.

EXAMPLE 1

*1-(2-hydroxyethyl)-3,5-diallyl isocyanurate*

40 parts of 1,3-diallyl isocyanurate and 10 parts of ethylene oxide were dissolved in 189 parts of N,N-dimethyl formamide and heated at 133 to 135° and atmospheric pressure for 2 hours. The solvent was stripped and the residue distilled through a short column in vacuo. 1-(2-hydroxyethyl)-3,5-diallyl isocyanurate was obtained in 75% yield. The product was a viscous, colorless liquid boiling at 140 to 142°/0.2 mm. Hg. The refractive index, $N_D^{25}$, was 1.5222. Elemental analysis: Calculated for $C_{11}H_{15}N_3O_4$: C, 52.20; H, 5.94; N, 16.60. Found: C, 52.20; H, 6.20; N, 17.08.

EXAMPLE 2

*1-(2-hydroxypropyl)-3,5-diallyl isocyanurate*

40 parts of propylene oxide and 104.5 parts of 1,3-diallyl isocyanurate were dissolved in 472 parts N,N-dimethyl formamide and heated at 130° at atmospheric pressure for 2 hours. The solvent was stripped and the residue distilled through a short column in vacuo. 1-(2-hydroxypropyl)-3,5-diallyl isocyanurate was obtained in 85% yield. The product was a liquid boiling at 130°/0.1 mm. Hg. The refractive index, $N_D^{25}$, was 1.5150. Elemental analysis: Calculated for $C_{12}H_{17}N_3O_4$: C, 53.90; H, 6.37; N, 15.73. Found: C, 53.69; H, 6.49; N, 16.22.

EXAMPLE 3

10 parts of 1-(2-hydroxyethyl)-3,5-diallyl isocyanurate prepared in Example 1 were mixed with 0.02 part benzoyl peroxide and about 5 parts benzene and spread on a sheet of plate glass. The coated plate was heated in an oven at 80 to 90° for 2 hours. The coating cured to a hard, clear adhesive coat having a Sward hardness of 48.

EXAMPLE 4

10 parts of 1-(2-hydroxypropyl)-3,5-diallyl isocyanurate prepared in accordance with Example 2 was mixed with 0.02 part benzoyl peroxide and about 5 parts benzene and spread on a sheet of plate glass. The coated plate was heated in an oven at 80 to 90° for 2 hours. The coating cured to a hard, clear adhesive coat having a Sward hardness of 40.

I claim:
1. The non-catalytic process for the production of 1-hydroxyalkyl-3,5-diallyl isocyanurates consisting essentially of heating a mixture of 1,3-diallyl isocyanurate and an alkylene oxide having 3 to 4 carbon atoms in an inert solvent.
2. The process of claim 1 wherein said mixture is heated at a temperature of 25 to 150° C.
3. The process of claim 1 wherein said alkylene oxide is propylene oxide.
4. The process of claim 1 wherein said solvent is 1-methyl-2-pyrrolidone.
5. The process of claim 4 wherein said mixture is heated at a temperature of from 120 to 140° C.

References Cited

UNITED STATES PATENTS

| | | | |
|---|---|---|---|
| 3,065,231 | 11/1962 | Frazier et al. | 260—248 |
| 3,088,948 | 5/1963 | Little et al. | 260—248 |
| 3,200,119 | 8/1965 | Hopkins | 260—248 |
| 3,215,758 | 11/1965 | Hopkins | 260—248 X |
| 3,231,577 | 1/1966 | Walles | 260—248 X |

WALTER A. MODANCE, *Primary Examiner.*

J. M. FORD, *Assistant Examiner.*